United States Patent Office 3,498,357
Patented Mar. 3, 1970

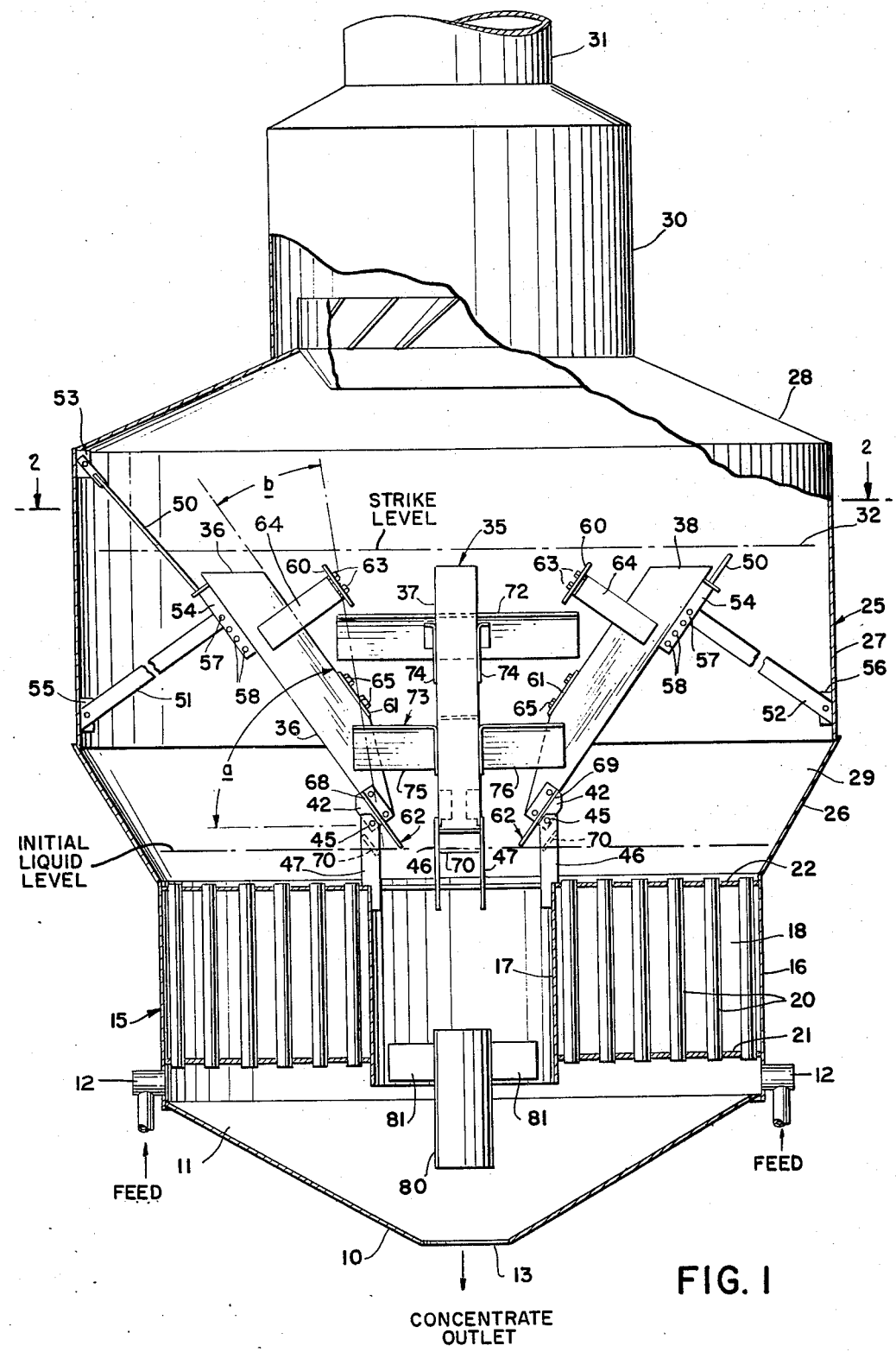

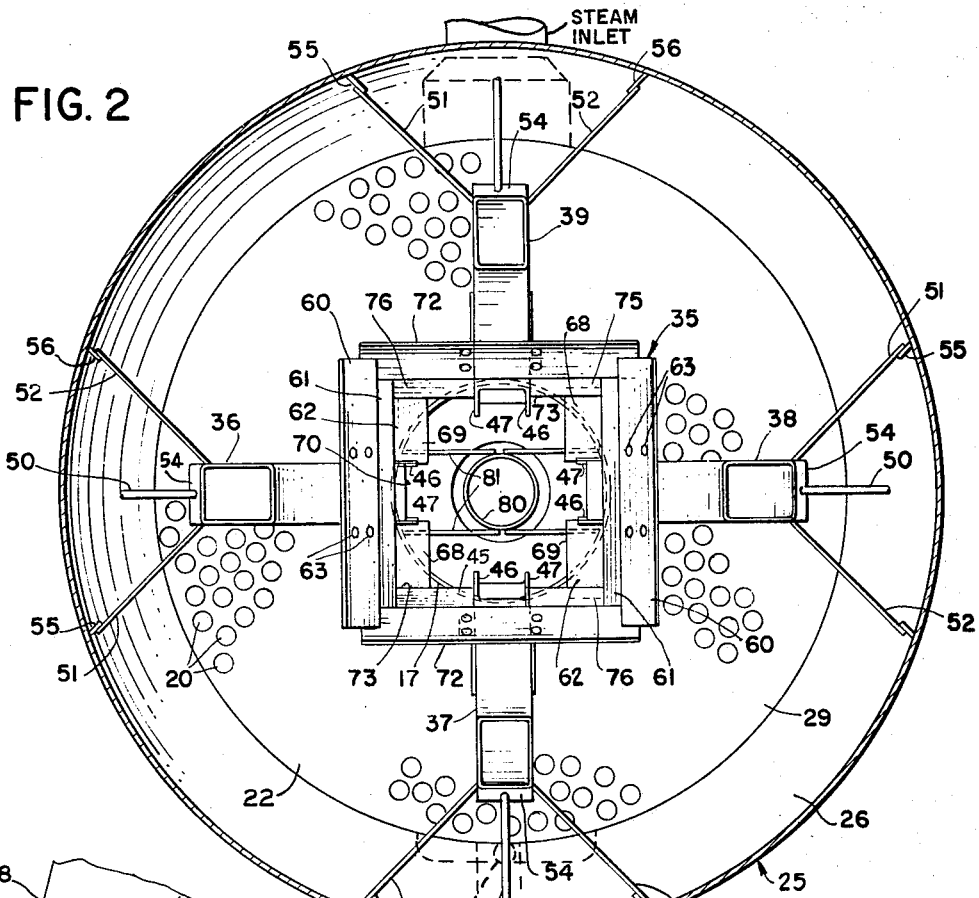
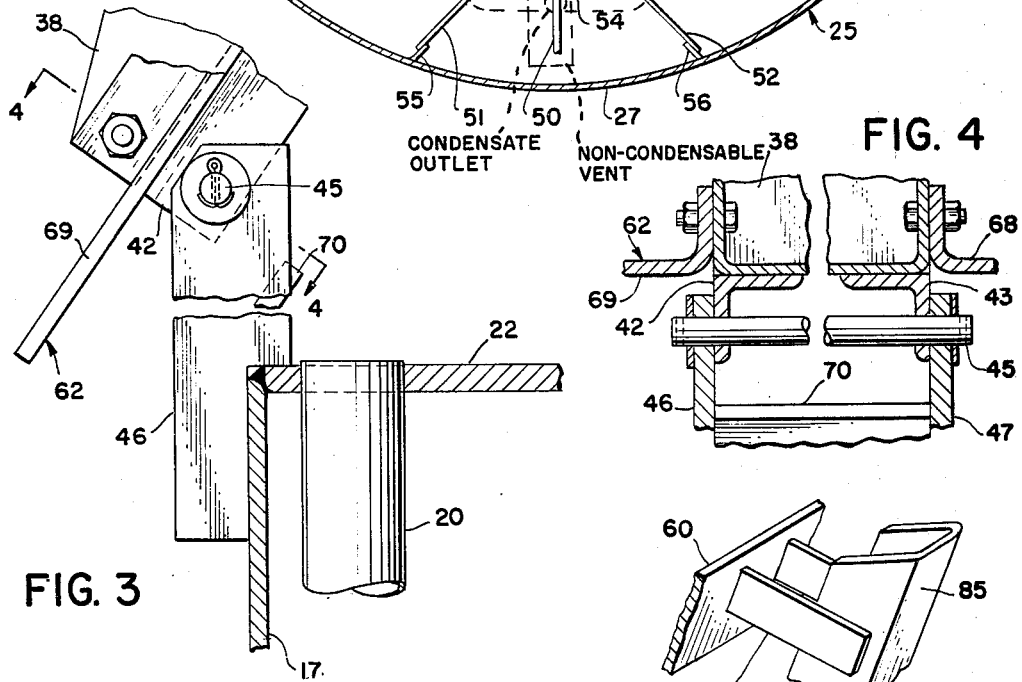

3,498,357
INTERNAL CIRCULATION INDUCING SYRUP CONCENTRATING VACUUM PAN
Thomas M. Hamill, P.O. Box 362,
Kailua, Hawaii 96734
Filed Aug. 22, 1967, Ser. No. 662,423
Int. Cl. B01d 1/08
U.S. Cl. 159—27                                6 Claims

ABSTRACT OF THE DISCLOSURE

A vacuum pan for concentrating sugar syrups in which a series of angularly disposed ducts extend from immediately beneath the periphery of the strike surface to positions adjacent the downtake. An additional duct is centrally disposed within the downtake and protrudes into the conical bottom chamber of the pan to insure the continuous circulation of even the more heavily concentrated product.

---

This invention relates to vacuum pans and more particularly to pans of the type which are commonly employed in the concentration of syrups and similar liquids.

There has been developed a vacuum pan for use in the manufacture of sugar which is extremely efficient and exhibits other important advantages. One such pan is disclosed, for example, in U.S. Patent 2,312,407 granted Mar. 2, 1943, to James Hamill. As is well known, vacuum pans are supplied with syrup which has been partially concentrated in a series of evaporators, and the syrup is permitted to circulate within the pan until it becomes fully concentrated and crystallization takes place. In pans of the type described in Patent 2,312,407, there is provided an annular structure in the form of a plurality of sets of vertically spaced curved louvres which promote the separation of the ascending and descending streams of syrup and thus greatly improve the flow characteristics within the pan.

Heretofore, in the use of vacuum pans including those of the foregoing type, difficulties were encountered in insuring the continuous and uninterrupted circulation of the syrup or other liquid throughout the pan without producing unwanted eddy currents, product stratification and related deleterious effects. In addition and this has been of special moment in vacuum pans having a conical bottom portion, the heavier product within the pan exhibited a tendency to drop from the circulating liquid mass and to settle at the bottom. These and other deficiencies have impaired the overall efficiency of the sugar manufacturing process and have unnecessarily increased the cost of the end product.

One general object of this invention, therefore, is to provide a new and improved vacuum pan for concentrating a liquid.

More specifically, it is an object of this invention to provide a vacuum pan of the character indicated in which the liquid being concentrated is continuously circulated within the pan along well-defined flow paths.

Another object of this invention is to provide a vacuum pan in which the structure utilized for insuring such continuous circulation may be readily incorporated within the pan without unduly restricting access to the calandria tubes or otherwise adversely affecting the pan's operating characteristics or normal maintenance procedures.

A further object of the invention is to provide a vacuum pan in which the dropout of heavy product conglomerations to the bottom of the pan is substantially reduced.

Still another object of the invention is to provide a new and improved vacuum pan that is economical to manufacture and thoroughly reliable in operation.

In one illustrative embodiment of this invention, the vacuum pan includes a calandria having a multiplicity of substantially parallel tubes and a pair of flat plates or tube sheets at opposite ends of the tubes. A low pressure chamber is positioned above the calandria in communication with the upper ends of the tubes, and an infeed chamber is disposed beneath the calandria and communicates with the lower ends of the tubes. The liquid to be concentrated is introduced into the infeed chamber and passes upwardly through the tubes to form a hot bubbly mass within the low pressure chamber. The mass of liquid is continuously directed through a cylindrical downtake which is substantially coextensive with the calandria and is recirculated through the tubes until the desired concentration is reached.

In accordance with one feature of the invention, there is provided novel duct means which is submerged beneath the upper or strike surface of the liquid mass within the low pressure chamber. The duct means is arranged to convey liquid substantially directly from the strike surface to the inlet of the downtake and serves to minimize the possibility of dead spaces existing within the chamber which might otherwise contribute to the formation of eddy currents, product stratification and other undesirable effects.

In accordance with another feature of the invention, in certain important embodiments, the duct means supports a series of vertically spaced louvres which are arranged somewhat in the form of an inverted pyramid above the downtake. The louvres direct the liquid entering the low pressure chamber away from the downtake and outwardly toward the inlet of the duct means. The louvres and the duct means cooperate with each other in a unique manner to provide an extremely well defined flow path for the circulating liquid within the chamber.

In accordance with another feature of several good embodiments of the invention, an additional duct of cylindrical configuration is centrally located within the downtake and extends into the infeed chamber of the vacuum pan. The duct is arranged to continuously direct a stream of the circulating liquid toward the lowermost portion of the pan and thus reduce the possibility of the heavier product settling out and collecting in the bottom of the pan.

In accordance with a further feature of the invention, in some embodiments, the duct means within the low pressure chamber is pivotally supported adjacent its lower end for movement from an operative position to a position substantially parallel to but spaced from the axes of the calandria tubes. With this arrangement, the tubes are readily accessible for maintenance purposes.

The present invention, as well as further objects and features thereof, will be understood more clearly and fully from the following description of certain preferred embodiments, when read with reference to the accompanying drawings, in which:

FIGURE 1 is a vertical sectional view, with certain portions shown in elevation, of vacuum pan apparatus in accordance with one illustrative embodiment of the invention;

FIGURE 2 is a sectional view taken along the line 2—2 in FIGURE 1;

FIGURE 3 is an enlarged fragmentary view of certain of the parts shown in FIGURE 1;

FIGURE 4 is a fragmentary sectional view taken along the line 4—4 in FIGURE 3; and FIGURE 5 is a fragmentary perspective view of a modified duct and associated parts which may be employed in the apparatus of FIGURE 1.

Referring to FIGURE 1 of the drawings, there is shown a vacuum pan which illustratively is of the low head type. The pan includes a bottom cone 10 which defines an infeed chamber 11. The cone 10 is provided with inlet nozzles 12 for introducing the syrup to be concentrated into the chamber 11. These nozzles are located at the periphery of the cone and are connected to a suitable manifold (not shown) coming from a vacuum pan supply tank. The cone includes a centrally located outlet 13 through which the concentrated product is discharged from the pan.

Positioned above the bottom cone 10 in coaxial relationship therewith is a calandria 15. The calandria 15 includes a cylindrical outer shell 16 and a cylindrical inner shell or downtake 17 which define an annular heating chamber 18 therebetween. A multiplicity of vertically extending tubes 20 are distributed substantially entirely throughout the heating chamber 18. The lower ends of the tubes 20 extend through corresponding apertures in an annular plate or tube sheet 21 which forms the bottom of the calandria 15. The upper ends of the tubes similarly are disposed in apertures in an annular tube sheet 22 at the top of the calandria. The downtake 17 is substantially coextensive with the calandria 15, the upper or inlet portion of the downtake being disposed at the level of the tube sheet 22 and the lower portion of the downtake protruding a short distance into the infeed chamber 11. The calandria is supplied with steam from a suitable source (not visible in the drawings), and the steam condenses on the tubes 20 and is drawn off in the usual manner through a condensate outlet and a vent for the incondensible gases.

A vapor section or "belt" 25 is disposed above the calandria 15. For vacuum pans of the low head type, the section 25 includes a flared or conical portion 26, a cylindrical side wall 27 and a dome 28, arranged in that order above the calandria. The section 25 forms a low pressure chamber 29 which is in open communication with the upper ends of the tubes 20. A separator 30 is mounted on the section 25 and includes a vapor outlet 31 which leads to a suitable condenser (not shown).

An initial charge of syrup is introduced into the infeed chamber 11 through the nozzles 12. The syrup passes upwardly through the tubes 20 in the calandria 15 into the vapor section 25. The volume of syrup in the initial charge customarily is sufficient to just cover the upper tube sheet 22. The syrup is heated during its passage through the tubes 20 to form a dense boiling mass of liquor or massecuite having a normal recirculation path which extends upwardly through the tubes 20 and then downwardly into the inlet end of the downtake 17 and through the downtake to the infeed chamber 11. As the concentration of the liquor proceeds, additional syrup is drawn into the infeed chamber 11 at the proper times to promote the formation of crystals in the usual way until the contents of the pan reach the strike level indicated by the dot-dash line 32. The contents are then removed from the pan and are introduced into a centrifugal separator where the crystals of sugar are separated from the residual liquid.

The structure described thus far is merely illustrative of a conventional combination of vacuum pan components. In any such combination it is desirable that all of the massecuite within the pan be continuously circulated to expose as much of the massecuite as possible to the same environmental conditions and to avoid the formation of dissimilar sized crystals and similar effects. Sluggish and indefinite flow patterns, aimless eddy currents and product stratification within the pan should be maintained at a minimum to insure the efficient production of sugar of satisfactory quality.

In vacuum pans of conventional construction, the ascending streams of liquid emerging from the upper ends of the calandria tubes exhibit a tendency to converge toward the inlet of the downtake at the center of the pan, rather than to rise to the surface of the liquid mass where the entrained bubbles can be released. This tendency is particularly evident with respect to the heavier product within the mass, which takes the shortest return path and consequently interferes with the descent of circulating liquid from the surface. In addition, particularly for low head type pans having flared vapor sections, the lighter product forms circulating eddy currents immediately beneath the peripheral surface of the mass. The circulation of the liquid has been further impeded heretofore in cases in which a comparatively large space exists between the lower end of the downtake and the apex at the bottom of the pan, and the heavier product conglomerations have exhibited a tendency to drop out of the circulating mass and collect on the bottom.

In the vacuum pan shown in the drawings, there is provided a circulation control system indicated generally at 35 which forms well-defined flow paths for the circulating liquid and substantially reduces adverse eddy current effects and product stratification. As best shown in FIGURE 2, the control system 35 includes four angularly disposed ducts 36, 37, 38, 39 which are submerged beneath the upper surface of the mass of the liquid within the low pressure chamber 29. These ducts are radially spaced apart at ninety degree angles and are each of closed, generally rectangular cross-section. Each duct is pivotally supported at its lower end adjacent the infeed portion of the downtake 17. Two angle brackets 42 and 43 (FIGURE 4) are affixed to the lower end of each duct, and the brackets 42 and 43 accommodate a pivot shaft 45. The shaft 45 in turn is carried by two upstanding plates 46 and 47 which are welded or otherwise rigidly secured in spaced-apart relationship with each other to the downtake 17.

The ducts 36, 37, 38 and 39 extend upwardly and outwardly from the corresponding pivot shafts 45 to positions immediately beneath the strike surface 32 of the massecuite within the vacuum pan. In the illustrated embodiment, each of the ducts is disposed at an acute angle with respect to the surface 32, such that the open upper ends of the ducts are oriented adjacent the peripheral portion of the surface. Each duct is rigidly but adjustably maintained in this position by a stay rod 50 and two braces 51 and 52. The stay rod 50 is pivotally affixed to a bracket 53 (FIGURE 1) on the inner surface of the side wall 27, and the rod extends inwardly and downwardly from this bracket with its inner end removably connected to the corresponding duct by a bracket assembly 54 on the lower surface of the duct. In a similar manner, the braces 51 and 52 are pivotally connected by brackets 55 and 56 to the inner surface of the wall 27, and the braces extend in an upward direction and are pivotally affixed to the duct by a pin 57. The pin 57 is disposed in one of several sets of apertures 58 in the bracket assembly 54.

The ducts 36 and 38 are spaced one hundred and eighty degrees apart and are each provided with three louvres 60, 61 and 62. The louvres 60 and 61 comprise flat rectangular plates which extend across the corresponding duct and are of a length which is somewhat greater than the diameter of the downtake 17. The louvre 60 is removably attached to the duct by bolts 63 and leg members 64, and the louvre 61 is removably mounted on the upper surface of the duct by bolts 65. The third louvre 62 is formed by two plates 68 and 69 (FIGURES 2 and 4). The plates 68 and 69 extend outwardly from opposite sides of the duct immediately adjacent the angle brackets 42 and 43.

The ducts 37 and 39 are oriented at right angles to the ducts 36 and 38 and are provided with two louvres 72 and 73. The louvres 72 are disposed adjacent the upper portions of the ducts 37 and 39 and are held in place by angle brackets 74 (FIGURE 1). The louvres 73 are each fabricated from two angle sections 75 and 76 which are mounted on opposite sides of the corresponding duct intermediate its ends.

A brace 70 is interposed between each pair of upstanding plates 46 and 47 on the downtake 17 to provide additional structural rigidity.

Rigidly supported within the downtake 17 is an upstanding cylindrical duct 80. The duct 80 is coaxial with the downtake 17 and is held in position by plates 81 which are welded to the inner wall of the downtake. The duct protrudes a substantial distance into the infeed chamber 11 with the lower end of the duct spaced a short distance above the apex of the conical bottom 10.

The angularly disposed ducts 36, 37, 38 and 39, the louvres 60, 61, 62, 72 and 73, and the centrally located duct 80, cooperate in a unique manner to insure the extremely smooth and uniform circulation of the massecuite within the vacuum pan. The relatively light product adjacent the upper peripheral portion of the mass of liquid within the pan enters the open upper ends of the ducts 36, 37, 38 and 39 and is conveyed directly to the infeed end of the downtake 17. The ducts thus provide multiple independent flow paths for the liquid and serve to break up aimless eddy currents and product stratification which might otherwise tend to form within this portion of the liquid mass.

The louvres 60, 61, 62, 72 and 73 provide an enlarged return flow area of square cross-section above the downtake 17. As the ascending mass of massecuite emerges from the calandria tubes 20, the louvres divert the mass toward the outside circumference of the vapor chamber 29. By utilizing straight louvres to provide a square area above the downtake, the rising massecuite is channeled toward the inlet ends of the ducts 36, 37, 38 and 39. The louvres in conjunction with the ducts direct the massecuite downwardly into the downtake 17 and enable a substantial reduction in local circulation and sluggish and indefinite movement within the boiling mass.

The massecuite passing through the downtake 17 enters the infeed chamber 11 and then spreads outwardly where it is returned to the calandria tubes 20. The heavier product within the massecuite exhibits a tendency to drop to the lower portion of the chamber 11, and in the absence of the passage defining duct 80 a portion of the product would settle out at the extreme bottom of the chamber. However, the duct 80 directs a stream of the circulating liquid directly at the apex of the bottom cone 10 to keep the heavy product in motion and prevent settling.

In the illustrated embodiment of the invention, each of the ducts 36, 37, 38 and 39 is disposed at an angle $a$ which illustratively is of the order of fifty-five degrees with respect to the horizontal. In several advantageous embodiments, this angle preferably is maintained within the range of from about fifty degrees to about sixty degrees in order to insure that the upper ends of the ducts are spaced an appropriate distance beneath the surface 32. The flat faces of the louvres 60, 61, 62, 72 and 73 similarly meet the horizontal at angles within this range, with the result that the ascending massecuite is properly deflected toward the inlet ends of the ducts.

In other embodiments of the invention, depending upon such factors as the geometry of the vacuum pan and the height of the strike surface 32, the angle $a$ may lie outside the above range without seriously impeding the circulation within the pan.

The successive louvres 60, 61 and 62 or 72 and 73 on each of the ducts 36, 37, 38 and 39 are spaced one above the other at progressively increasing distances from the axis of the downtake 17. With this arrangement, there is provided an enlarged funnel-shaped area above the downtake of a configuration which approximates an inverted pyramid. In the illustrated embodiments, the angle $b$ between each duct and a line connecting the centers of the louvres carried by the duct is approximately twenty-seven degrees, and the line meets the horizontal at an angle of about eighty-two degrees. The diverging arrangement of the louvres, coupled with their angular inclination, insures that the vapor bubbles within the ascending massecuite are directed in an outward direction sufficiently so that the bubbles may be intercepted by the next louvre and thus continue their outward ascending movement. The louvres on each duct are arranged in staggered relationship with respect to the louvres on the adjacent ducts to provide openings between the louvres at substantially each level within the vapor section 25.

Each of the ducts 36, 37, 38 and 39 may be quickly and easily moved to a substantially vertical position to provide ready access to the calandria tubes 20 for maintenance purposes, for example. To accomplish such movement, each duct is detached from the supporting stay rod 50 and the braces 51 and 52 and is then pivoted inwardly about the pivot shaft 45. The calandria tubes beneath the duct may then be readily removed for repair or replacement.

As indicated heretofore, each of the ducts 36, 37, 38 and 39 is of generally rectangular cross-section to provide an enclosed path for the circulating liquid. In other advantageous arrangements, the vacuum pan includes channel or trough shaped ducts which are open adjacent their upper portions. As an illustration, in FIGURE 5 there is shown a duct 85 which is generally similar to the duct 38 (FIGURE 1) described heretofore but is of C-shaped cross-section. One advantage of using ducts of this latter configuration is that the ducts may be readily washed by spraying after each strike.

Although the invention has been shown and described as being of particular utility when utilized with vacuum pans of the low head type, it also may be employed with good effect in parallel-sided pans or in other types of liquid concentrating apparatus in which the continuous circulation of the liquid within the apparatus is either necessary or desirable.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

What is claimed is:

1. In apparatus for concentrating a liquid, in combination: calandria means including a heating chamber having at least one liquid conveying passage therein; means defining a low pressure chamber positioned suprajacent said heating chamber in communication with said passage; infeed means for introducing liquid to be concentrated into said calandria means, said liquid passing through said passage and forming a heated mass of liquid having an upper surface in said low pressure chamber; recirculation means having an inlet communicating with said low pressure chamber for continuously withdrawing liquid therefrom and returning the withdrawn liquid to said infeed means; means including a plurality of angularly disposed ducts submerged beneath the upper surface of the liquid mass in said low pressure chamber for conveying liquid along a series of flow paths from immediately beneath said surface to the inlet of said recirculation means; and means supporting each of said angularly disposed ducts for pivotal movement with respect to said calandria means, each of said ducts comprising an open channel of U-shaped cross-section with its open side facing upwardly.

2. In a vacuum pan, in combination: calandria means including a cylindrical heating chamber having a multiplicity of substantially vertical parallel tubes therein; means defining a cylindrical low pressure chamber positioned above said heating chamber in communication with said tubes, said low pressure chamber being enlarged with respect to said heating chamber and being in coaxial relationship therewith; means defining an infeed chamber positioned beneath said heating chamber in communication with said tubes; means for introducing liquid to be concentrated into said infeed chamber, said liquid passing upwardly through said tubes and forming a hot bubbling mass of liquid having a free upper surface in said low pressure chamber; a cylindrical downtake coaxial and substantially coextensive with said calandria means and having an inlet communicating with said low pressure chamber for continuously withdrawing liquid therefrom and recirculating the same through said inlet chamber and said tubes; passageway defining means located within said downtake and extending a substantial distance into said infeed chamber; means including a plurality of louvres mounted adjacent said downtake for directing the liquid entering said low pressure chamber away from said inlet and outwardly toward the free upper surface of the mass of liquid therein, said louvres being of flat configuration and being spaced one above the other at progressively increasing distances from the axis of the cylindrical downtake; and duct means submerged beneath the upper surface of the mass of liquid in said low pressure chamber for conveying liquid from immediately beneath said surface to the inlet of said downtake.

3. In a vacuum pan, in combination: calandria means including a cylindrical heating chamber having a multiplicity of substantially parallel tubes therein; means defining a cylindrical low pressure chamber positioned above said heating chamber in communication with said tubes, said low pressure chamber being enlarged with respect to said heating chamber and being in coaxial relationship therewith; means defining an infeed chamber positioned beneath said heating chamber in communication with said tubes; means for introducing liquid to be concentrated into said infeed chamber, said liquid passing upwardly through said tubes and forming a hot bubbling mass of concentrated liquid having an upper surface in said low pressure chamber; a cylindrical downtake coaxial and substantially coextensive with said calandria means and having an inlet communicating with said low pressure chamber for continuously withdrawing liquid therefrom and recirculating the same through said inlet chamber and said tubes; passage defining means located within said downtake and extending a substantial distance into said infeed chamber; means including a plurality of sets of vertically spaced louvres arranged at right angles to each other above the downtake inlet for directing the liquid entering said low pressure chamber away from said inlet and outwardly toward the upper surface of the mass of liquid therein; and duct means submerged beneath the upper surface of the mass of liquid in said low pressure chamber for conveying liquid from immediately beneath the periphery of said surface to the inlet of said downtake, said duct means including a plurality of radially disposed ducts pivotally supported adjacent said inlet and extending upwardly and outwardly therefrom.

4. In a vacuum pan of the character set forth in claim 3, each of said ducts being disposed at an acute angle with respect to the horizontal, said acute angle lying within the range of from about fifty degrees to about sixty degrees.

5. In a vacuum pan of the character set forth in claim 3, each of said ducts being of C-shaped cross-section.

6. In a vacuum pan, in combination: calandria means including a heating chamber having a multiplicity of substantially parallel tubes therein; means defining a low pressure chamber positioned above said heating chamber in communication with said tubes; means defining an infeed chamber positioned beneath said heating chamber in communication with said tubes; means for introducing liquid to be concentrated into said infeed chamber, said liquid passing upwardly through sad tubes and forming a hot bubbling mass of liquid having an upper surface in said low pressure chamber; downtake means having an inlet communicating with said low pressure chamber for continuously withdrawing liquid therefrom and recirculating the same through said inlet chamber and said tubes; and duct means submerged beneath the upper surface of the mass of liquid in said low pressure chamber for conveying liquid from immediately beneath the periphery of said surface to the inlet of said downtake means, said duct means including a plurality of ducts of C-shaped cross-section supported within said low pressure chamber, each of said ducts comprising an open channel with its open side facing upwardly.

References Cited

UNITED STATES PATENTS

| | | | |
|---|---|---|---|
| 828,524 | 8/1906 | Warren | 159—27 |
| 898,147 | 9/1908 | Von Seemen | 159—27 |
| 2,106,295 | 1/1938 | Cook | 159—27 X |
| 2,258,704 | 10/1941 | Hamill | 159—27 |
| 2,326,024 | 8/1943 | George | 159—28 |
| 2,326,619 | 8/1943 | Carreras | 159—27 |
| 2,494,767 | 1/1950 | Lindsay | 159—27 |

FOREIGN PATENTS

| | | |
|---|---|---|
| 166,897 | 12/1905 | Germany. |
| 216,745 | 11/1909 | Germany. |

WILBUR L. BASCOMB, Jr., Primary Examiner

J. SOFER, Assistant Examiner

U.S. Cl. X.R.

127—16; 159—45